United States Patent [19]

Yunoki

[11] Patent Number: 5,717,859
[45] Date of Patent: Feb. 10, 1998

[54] MULTIMEDIA COMMUNICATIONS SYSTEM FOR CONTROLLING PLURALITY OF CALLS BY INTEGRATING THE CALL OBJECTS THROUGH AN INTEGRAL OBJECT

[75] Inventor: Hideo Yunoki, Kawasaki, Japan

[73] Assignee: Fujitsu Limited, Kawasaki, Japan

[21] Appl. No.: 381,072

[22] Filed: Jan. 31, 1995

[30] Foreign Application Priority Data

Mar. 18, 1994 [JP] Japan ................... 6-049374

[51] Int. Cl.⁶ ................... H04J 3/16; H04L 12/18
[52] U.S. Cl. ................... 395/200.12; 395/200.04; 370/431
[58] Field of Search ........... 395/200.04, 200.12; 370/58.2; 379/201, 207, 431

[56] References Cited

U.S. PATENT DOCUMENTS 5,384,771  1/1995  Isidoro et al. ................... 370/58.2

FOREIGN PATENT DOCUMENTS 631457  12/1994  European Pat. Off. .
641 133  3/1995  European Pat. Off. .
2 243 517  10/1991  United Kingdom .

OTHER PUBLICATIONS

Steven Minzer "A signaling Protocol for Complex Multimedia Services", IEEE Journal on Selected Areas in Communications, pp. 1383–1394, Dec. 1991.

Hellemans et al. "A Signaling Protocol Supporting Multi-Media and Supplementary Services", GLOBECOM '92: IEEE Global TeleCommunications Conference, pp. 1388–1394, 1992.

Hellemans et al. "A New Approach to Service Intelligence Supported By ATM", GLOBECOM '90: IEEE Global Telecommunications Conference, 1990.

*Primary Examiner*—Thomas C. Lee
*Assistant Examiner*—D. Dinh
*Attorney, Agent, or Firm*—Staas & Halsey

[57] ABSTRACT

In multimedia communications, a parent connection point and a Leg are generated for the communications resources of the first call, and a child connection point and a Leg are generated for the communications resources of a call subsequently generated and assigned the same call reference number. A Call object is generated to integrate the parent CP and the child CPs. The entire multimedia call is managed through the Call object and the Call object is generated and deleted by a parent connection point.

15 Claims, 16 Drawing Sheets

SPECIFIC NUMBER
CONVERSION TABLE

| SPECIFIC NUMBER | |
|---|---|
| | CORRESPONDING DN |
| | |

FIG. 9

CP ATTRIBUTE TABLE

| CP NO. |
| --- |
| MAXIMUM THROUGHPUT |
| TRANSMISSION QUALITY |
| DIRECTIONAL FEATURE |
|  |

FIG. 10

MULTIMEDIA COMMUNICATIONS SYSTEM FOR CONTROLLING PLURALITY OF CALLS BY INTEGRATING THE CALL OBJECTS THROUGH AN INTEGRAL OBJECT

BACKGROUND OF THE INVENTION

1. Field of the Invention

The present invention relates to a communications control system in multimedia communications which utilizes various communication media such as sound, graphics, animation, and text.

2. Description of the Related Art

Recently, an intelligent network (IN) has been developed as a system capable of developing a service application program independently of hardware by collectively managing, at a point in a network, service application programs conventionally provided for respective switching units.

However, realized in the conventional IN is only an integrated control procedure between a service control point (SCP) and a service switching point (SSP) in a specific communications network, and the control procedure among communications networks should be defined separately. That is, each communications network has its own control instructions, and therefore a program developed in an intelligent communications network cannot be used in another intelligent communications network in the conventional IN system.

Proposed to solve such problem is an advanced intelligent network (AIN) in which a control procedure between the service control point and the service switching point is performed independently of communications networks.

With an increasing amount of communications data in a transmission line by an introduction of optical cables, multimedia communications services have been presented lately, which perform various communications using voice, graphics, animation, text, etc. simultaneously.

However, since communication using voice, graphics, animation, and text is processed as an independent call in currently used multimedia communications, a terminal user has to specify a receiving terminal unit for each communication medium, for example, a receiving terminal for voice data communication, a receiving terminal for graphic data communication, etc., thereby requiring complicated operations. Additionally, a switching unit in the current communications system performs call processing, such as setting and disconnecting a call, demanding an account, separately for each call even in the multimedia communications by the same user. Thus, there arise a large number of call processing with a heavy load of processing on the switching unit.

SUMMARY OF THE INVENTION

An object of the present invention is to simplify the operations performed by a terminal unit in multimedia communications and to reduce the process load in a communications network.

In a multimedia communications system for performing communications using a plurality of media among a plurality of terminal units, an object generating unit generates an object which corresponds to a communications resource assigned to an individual communications request in multimedia communications, with the relation to other objects defined. It also generates an integrated object which integrates the plurality of objects.

A communications control unit integrally controls communications using a plurality of different media by managing a plurality of objects belonging to the same integral object generated by the object generating unit based on the relationships among the plurality of objects.

The intelligent network realized by the present invention comprises a service control point for integrally controlling services provided in a communications network and a plurality of service switching points for accommodating a plurality of terminal units and processing calls among the terminal units. The service control point and the service switching point comprise the object generating unit and the communications control unit.

The object generating unit generates Legs corresponding to communications resources assigned to calls, for example, trunks, channels, etc. of an exchange, and connection points for connecting the Legs to one another. The connection point generated for the first call request is defined as a parent connection point, and connection points generated subsequently and related to the same multimedia call are defined as child connection points. It further generates a Call object for integrating the plurality of connection points and the plurality of the legs.

The communications control unit integrally controls a multimedia call containing a plurality of calls by managing the connection points and Legs based on the relationships among the plurality of connection points belonging to the same Call object.

An object may be generated by only a service switching point, and a service control point can have the capability to process an object generated by the service switching point.

When a communications request is sent by a terminal unit, generated are an object which corresponds to the communications resource assigned to each communications request and defines the relation with other objects, and an integration object for integrating the plural objects. Since a plurality of calls are processed as a single multimedia call based on the relationship among the objects (for example, a parent-child relationship among connection points), a plurality of calls using different communications media can be integrally managed, thereby reducing the process loads in call processing on a multimedia communications network. Furthermore, since integrally processing a plurality of calls simplifies an operation at a call establishment and disconnection at a terminal unit, it also reduces a user's load.

BRIEF DESCRIPTION OF THE DRAWINGS

FIG. 9 shows the configuration of the specific number conversion table;

FIG. 10 shows the configuration of the CP attribute table;

DESCRIPTION OF THE PREFERRED EMBODIMENTS

Figure 1:
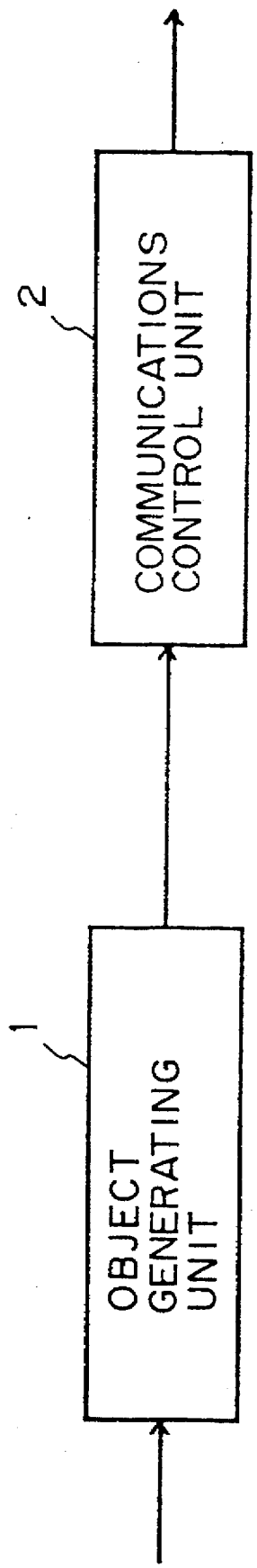
FIG. 1 is a block diagram (1) showing the principle of the present invention.

FIG. 1 is a block diagram showing the principle of the present invention. In a multimedia communications system in which communications are established using a plurality of media among a plurality of terminal units, an object generating unit 1 generates an object defined as being associated with other objects corresponding to communications resources assigned to each communications request in the multimedia communications. It also generates an integration object to integrate a plurality of generated objects.

A communications control unit 2 collectively controls communications of different media by controlling the objects based on the relationships among the plural objects belonging to the same integration object generated by the object generating unit 1.

Figure 2:
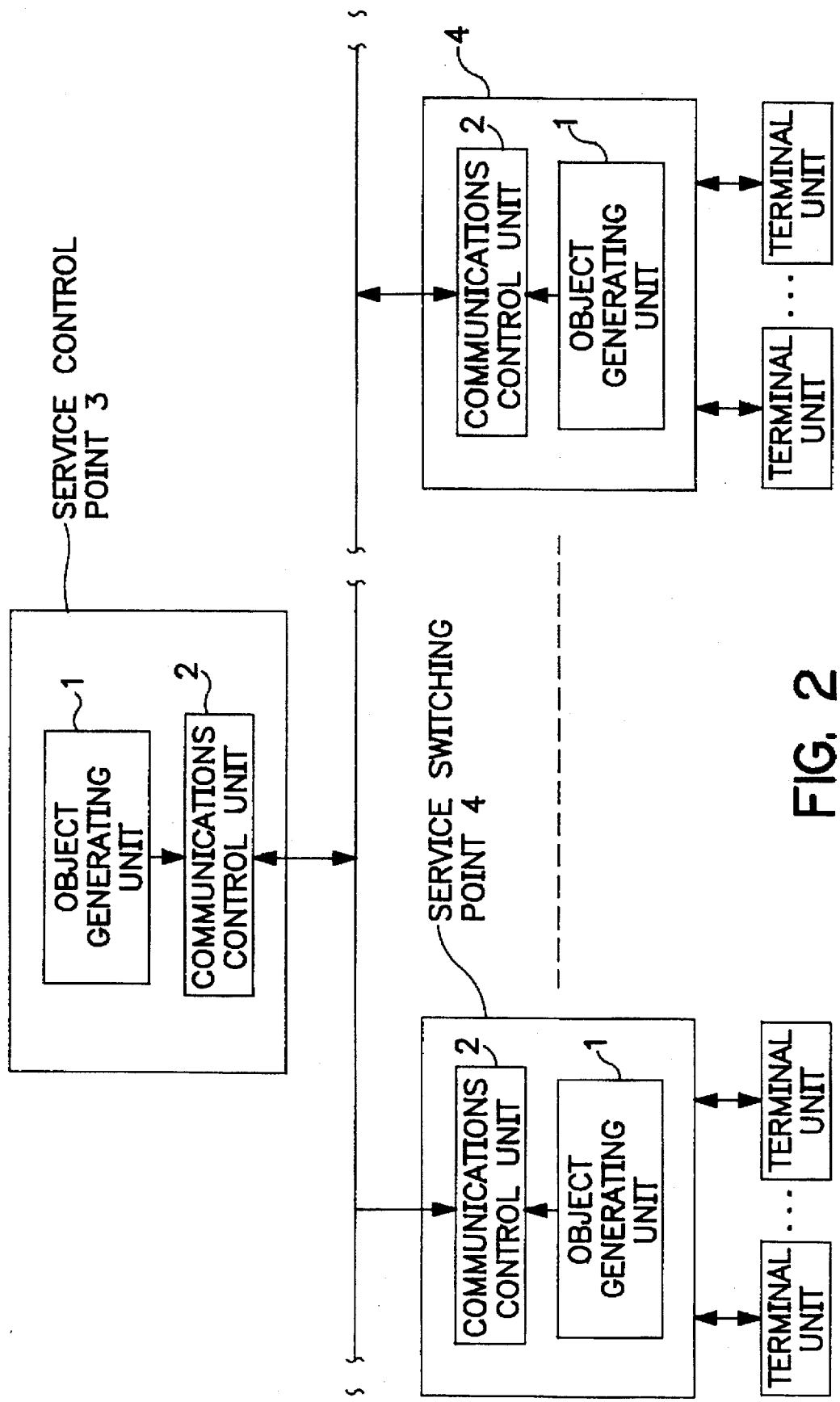
FIG. 2 is a block diagram (2) showing the principle of the present invention.

FIG. 2 is a block diagram showing the principle of the system configuration when the present invention is applied to an intelligent communications network. The intelligent network comprises a service control point 3 for collectively controlling a service provided in a communications network; and a service switching point 4 for accommodating a plurality of terminal units and processing calls among the terminal units. Each of the service control point 3 and the service switching point 4 comprises the object generating unit 1 and the communications control unit 2.

The object generating unit 1 generates Legs which are objects corresponding to the communications resources, such as trunks, channels, etc. of a switching unit, and connection points, which are objects connecting the Legs. It defines the connection point generated for the first call request as a parent connection point; and connection points subsequently generated for the same multimedia call as child connection points. The object generating unit 1 also generates a Call object for integrating the connection points and the Legs.

The communications control unit 2 collectively controls a multimedia call containing a plurality of calls by managing connection points and Legs based on the relationships among plural connection points belonging to the same call object. The present invention can also be designed such that the objects are generated by the service switching point 4 only, and the service control point 3 processes the objects generated by the service switching point 4.

According to the present invention, generated are an object which is associated with other objects and corresponds to communications resources assigned to each communications request of multimedia communication; and an integration object for integrating of the objects when a request for multimedia communications is issued by a terminal unit. Then, a plurality of calls are processed as a single multimedia call based on the relationship among the objects (for example, a relationship between a parent connection point and a child connection point, etc.). Thus, a plurality of calls of different communications media can be collectively managed, thereby reducing a load required in call processing in the communications network in which multimedia communications are provided. Furthermore, an integral processing of a plurality of calls simplifies an operation performed to establish or disconnect a call and therefore reduces the load on the user.

Figure 3:
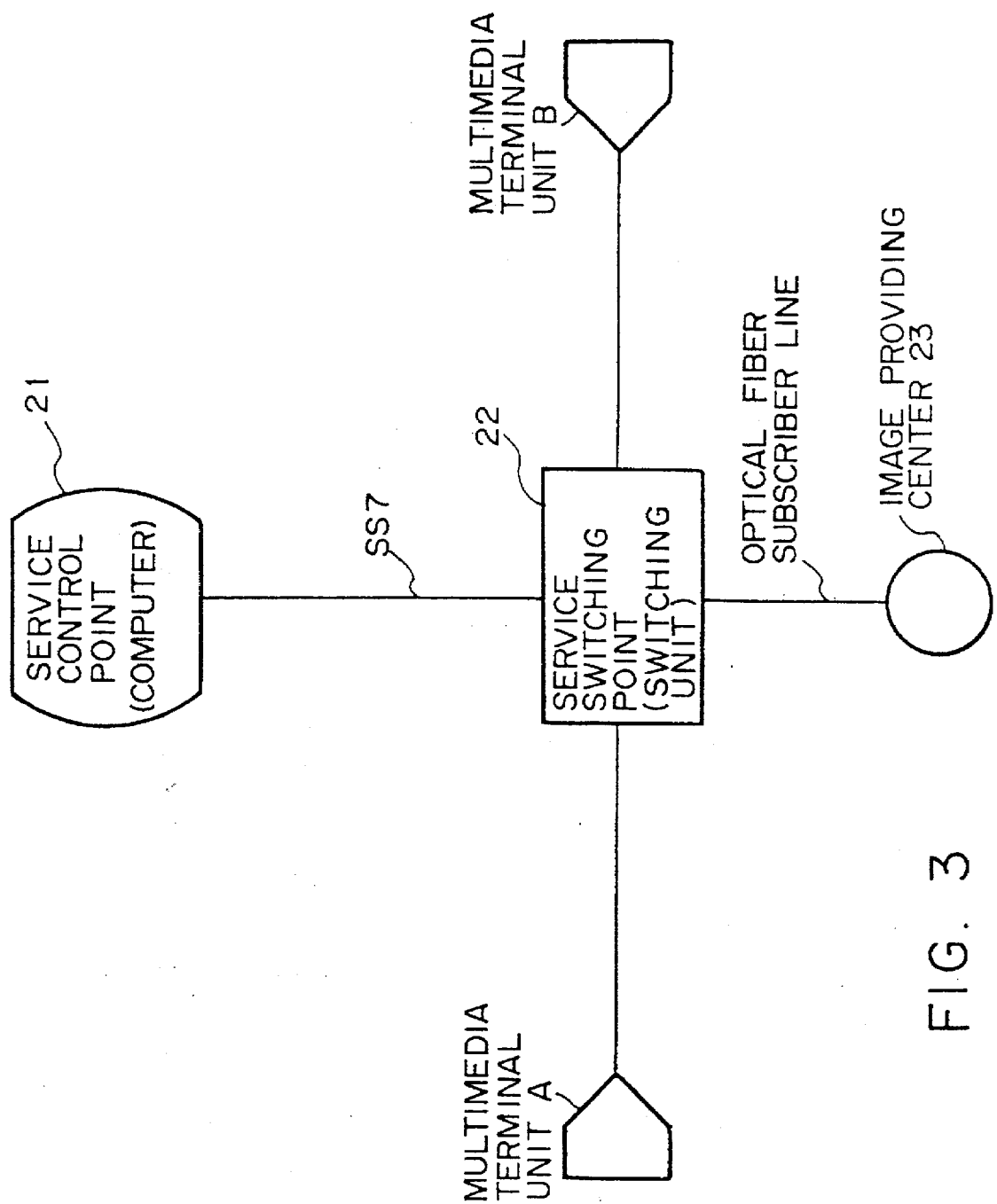
FIG. 3 shows the system configuration of the intelligent network of an embodiment.

The embodiments of the present invention are described below by referring to the attached drawings. FIG. 3 shows the configuration of an advanced intelligent network system (hereinafter referred to as an AIN) according to the multimedia communications system of the present invention. The embodiment is realized by applying the present invention to the AIN in an asynchronous transfer mode (ATM) switching network.

In FIG. 3, a service control point (SCP) 21 is a control device for processing subscriber information, controlling a data base, etc. and is provided with an integral data base containing subscriber information, network configuration information, service application programs, etc. together with a function of performing a communications process, providing services, etc.

A service switching point (SSP) 22 is an ATM switching unit, transmits a service request from a subscriber to the service control point 21, and controls a communications network according to the instruction of the service control point 21.

A plurality of the service switching points 22 can be connected to the service control point 21 and a control signal is transmitted between the service control point 21 and the service switching point 22 through a common channel signaling #7.

Multimedia terminal units A and B, a plurality of terminal units not shown in FIG. 3, and an image providing center 23 are connected to the service switching point 22. The image providing center 23 is connected to the service switching point 22 via an optical fiber subscriber line.

The configurations of the above service control point 21 and service switching point 22 are described below by referring to FIGS. 4 and 5 respectively.

Figure 4:
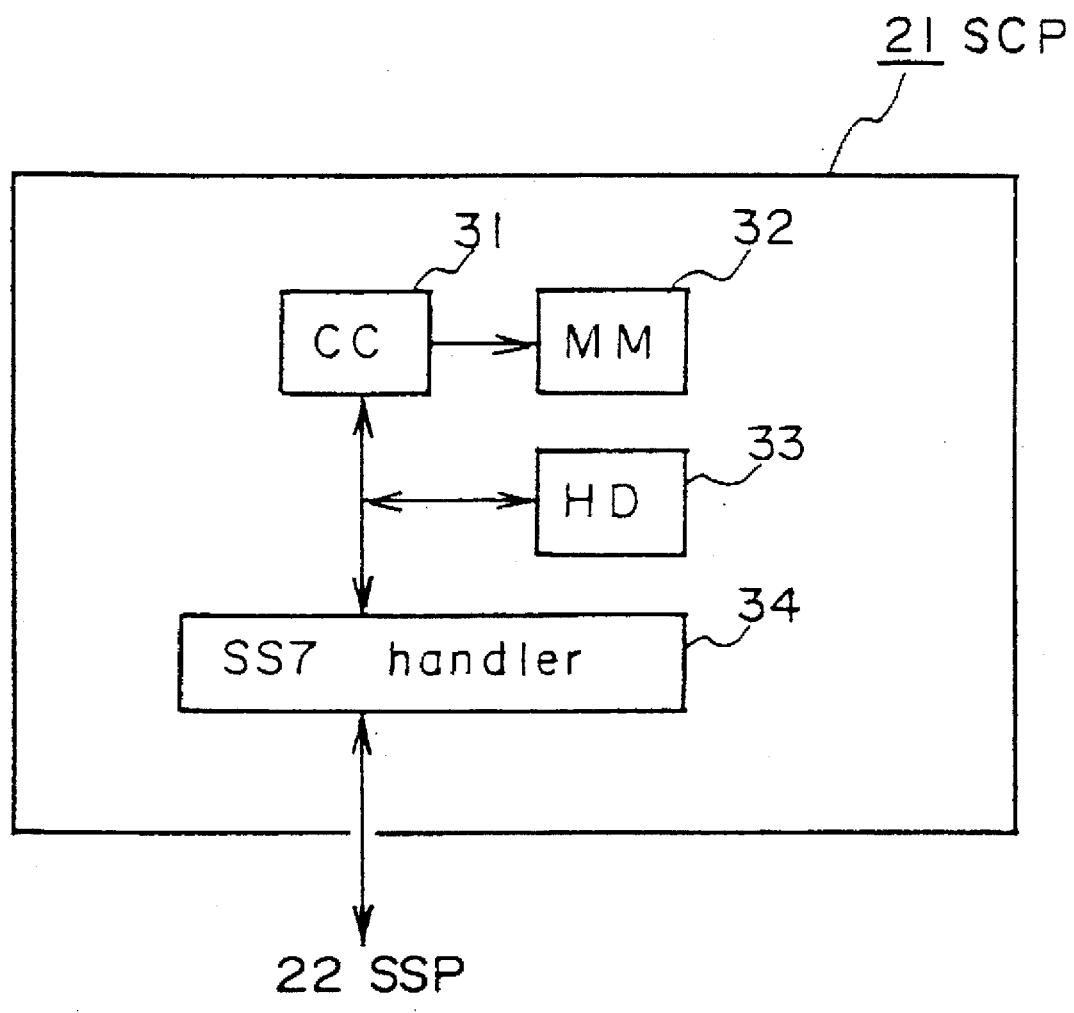
FIG. 4 shows the configuration of the service control point.

The service control point 21 comprises a processor (CC) 31; a memory (MM) 32 for storing an advanced intelligent network call model (described later) processing program, a service control program, etc.; a hard disk (HD) 33 for storing subscriber information, a service application program, etc.; and a protocol handler (SS7 handler) 34 for performing an inter-work with the service switching point 22, through the common channel signaling #7 as shown in FIG. 4.

Figure 5:
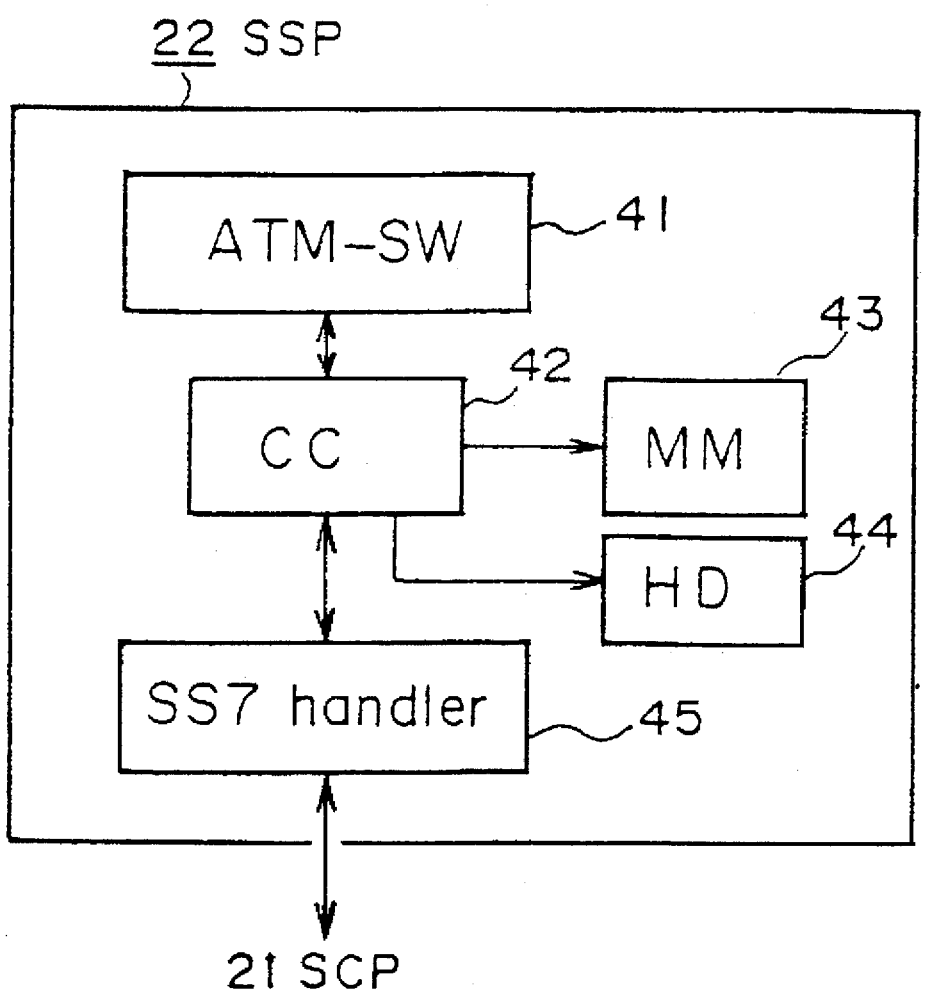
FIG. 5 shows the configuration of the service switching point.

As shown in FIG. 5, the service switching point 22 comprises an ATM switch (ATM-SW) 41 having an ATM switching function; a processor (CC) 42 for processing a call; a memory (MM) 43 for storing a control program for an AIN; a hard disk 44; and an SS7 handler 45 for protocol conversion between the protocol of the common channel signaling #7 and an ATM-SM internal protocol.

The advanced intelligent network call model (hereinafter referred to as an AIN call model) is described below by referring to FIGS. 6 and 7.

In a multimedia communications service, if a call request is issued by a subscriber terminal unit, the service switching point 22 generates an object consisting of a connection point (CP) and a Leg, corresponding to communications resources (physical or logical resources) assigned to the call request, and then generates a single Call object in response to a single multimedia call.

Figure 6:
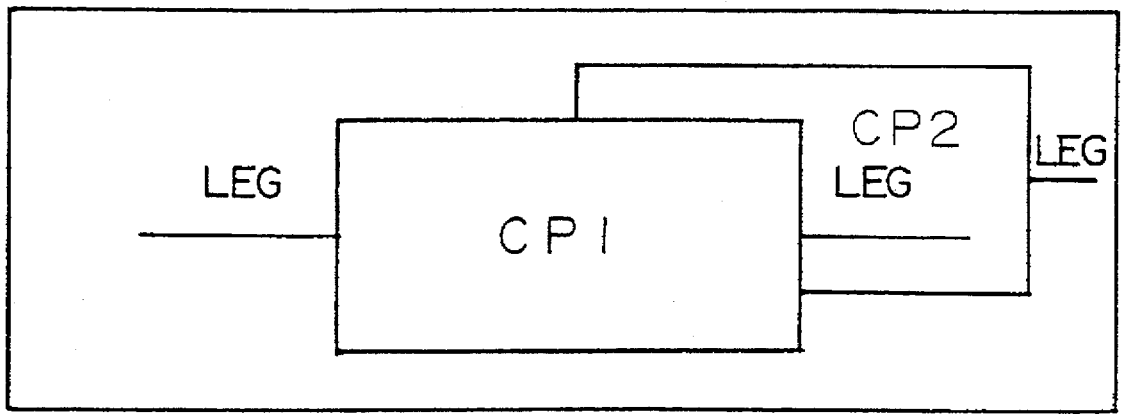
FIG. 6 shows the AIN call model.

FIG. 6 shows the relation among objects. CP1 and CP2 indicate connection points, and Legs are connected to both ends of blocks corresponding to connection points CP1 and CP2. The objects are included in the Call object.

A Leg is an object indicating an input/output of communications, and is generated corresponding to physical resources such as a trunk, subscriber line and logical resources such as a channel, etc. A connection point (CP) is an object connecting the Legs. In the service switching point 22 and the service control point 21, a call is defined using a connection point and a Leg, and is controlled between the service switching point 22 and the service control point 21 based on the objects.

Then, a call reference number (CRNO) is assigned to the first call request in a single multimedia communication, and a connection point generated at this time is defined as a parent CP, and connection points generated subsequently with the same call reference number are associated with the parent CP as child CPs.

For example, if terminal A shown in FIG. 3 issues the first call request to terminal B in a multimedia communications service, the service switching point 22 generates a Leg corresponding to a path to terminal A (for example, Leg No. 1), a Leg corresponding to a path to terminal B (for example, Leg No. 2), and a parent connection point CP1 connecting the Legs. Simultaneously, a Call object containing the Legs and CP1 is generated.

Then, when a path (for example, a path for use in text communication) is established between terminal B and the image providing center 23, the service switching point 22 generates a Leg corresponding to a path to terminal B, a Leg corresponding to a path to the image providing center 23, and a connection point connecting the Legs. The connection point generated at this time is associated as a child connection point CP2 with the already generated parent CP1, and as a part of the Call object containing the parent CP1.

If another path (for example, a graphics communications path) is set between the image providing center 23 and terminals A and B, then the service switching point 22 generates a Leg corresponding to a path to the image providing center 23, a Leg corresponding to a path to terminal B, a Leg corresponding to a path to terminal A, and a connection point connecting the Legs. The connection point generated at this time is associated as a child connection point CP3 with the already generated parent CP1, and is associated as a part of the Call object.

Figure 7:
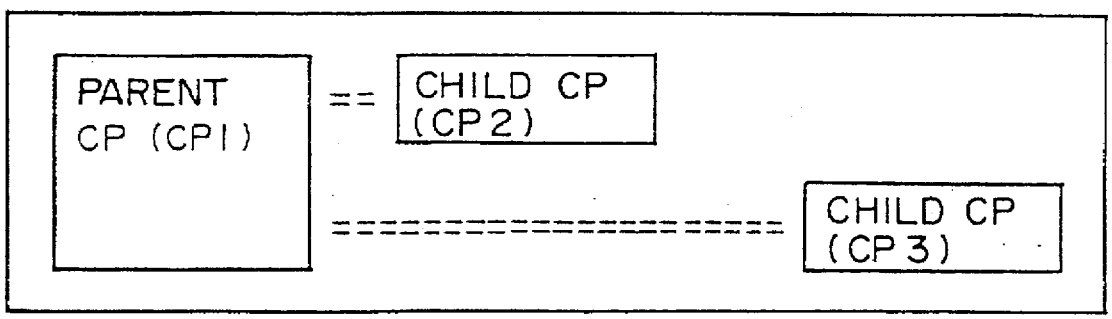
FIG. 7 shows the multimedia Call object.

FIG. 7 shows the multimedia Call object indicating the relationship between the parent CP1 and the child CPs 2 and 3. In the multimedia communications, the connection point for the first call is generated as a parent CP, and the connection points generated subsequently for the same multimedia call are associated as the child CPs with the parent CP. The entire multimedia call are managed by a Call object. The Call object is generated and deleted by a parent CP.

Thus, representing a plurality of calls of different media in the multimedia communications by a Leg and a connection point makes it possible to define the relationship between a call and communications resources in a communications network independently of the instruction system of the network. Furthermore, associating the connection points of a plurality of calls in a single multimedia communication with each other and processing them as a single Call object enables the plural calls of different media to be processed collectively.

According to the present embodiment, a call is set for each communications media, and a connection point is generated for each call correspondingly. The first generated connection point in the plural connection points is defined as a parent CP and the subsequently generated connection points having the same call reference number are associated with the parent CP as child CPs. The parent CP and the child CPs have following features.

A multimedia call can be disconnected (all connection points can be released) only from a terminal unit connected to a Leg of the parent CP. Entire call cannot be disconnected (a Call object cannot be released) from a terminal unit which is connected to a Leg of the child CP. The terminal can release its own connection point only. If a Leg of the parent CP issues a request to disconnect an individual CP, not a request to disconnect a multimedia call, then physical resources (circuits, channels, etc.) concerning the parent CP can be released, but virtual resources such as Legs and CP attributes in a call-related table and a CP-related table (described later) are not deleted.

Since the Leg information [a Leg number, a directory number (DN)(terminal unit designation number)] of the parent CP can be used as a directory number when a child CP is generated, an entry operation of a directory number can be omitted for the same directory number.

Then, the configurations of the Call-related table and the CP-related table generated in the service control point 21 and the service switching point 22 are described below by referring to FIG. 8.

For example, if a call request is issued with a specific number (for example, a free-charge dial number) designated as a destination directory number, then the service switching point 22 transmits the specific number to the service control point 21. Simultaneously, the service switching point 22 generates a connection point and a Leg in response to the call request, assigns them a parent CP number and a Leg number (Leg No.), and transmits them together with a source directory number, a media type, etc. Go the service control point 21.

Upon receipt of the data of a specific number, the service control point 21 activates a service logic program (SLP), refers to the specific number conversion table shown in FIG. 9 through the service logic program, converts the designated specific number data into a corresponding destination directory number, and transmits the destination directory number to the service switching point 22.

Figure 8:
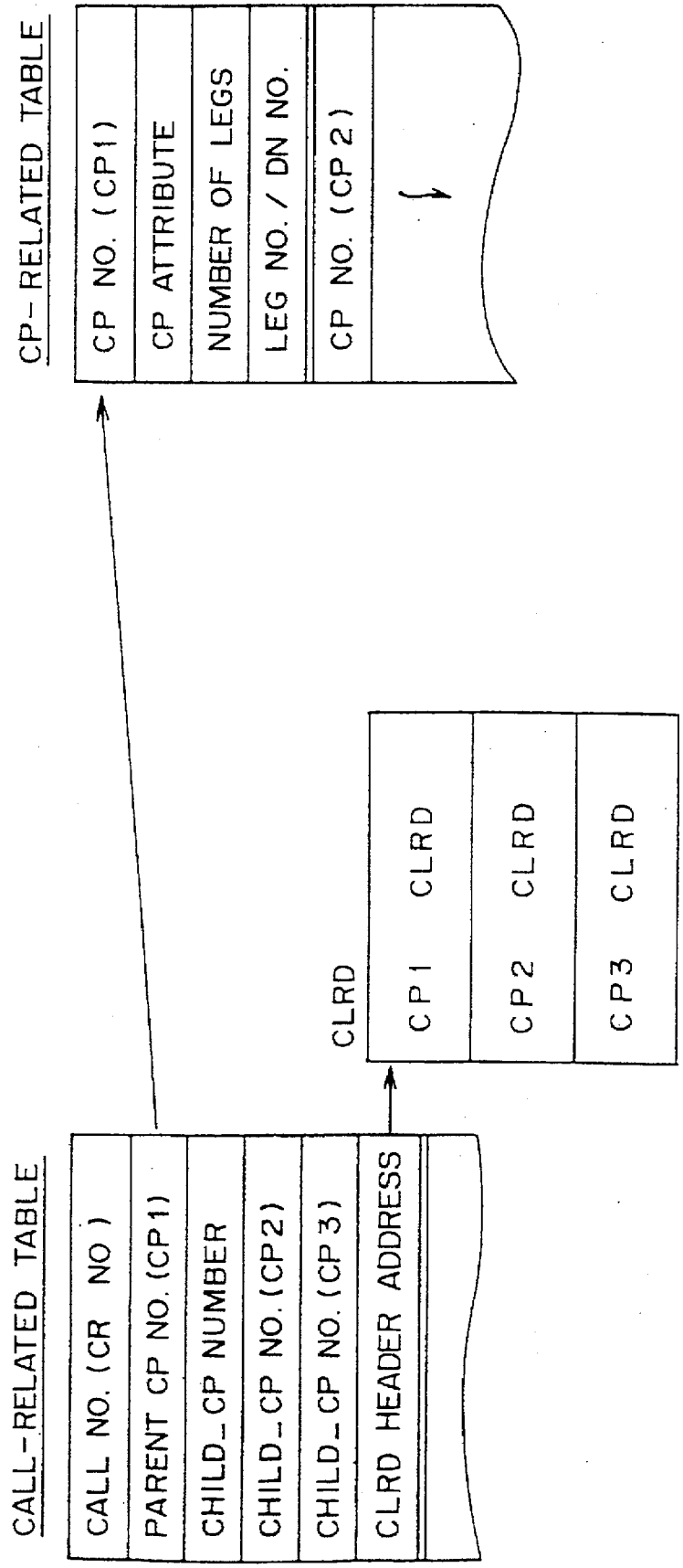
FIG. 8 shows the configuration of the Call-related table and the CP-related table.

The service control point 21 and the service switching point 22 generates the Call-related table, the CLRD field, and the CP-related table shown in FIG. 8, and the CP attribute table shown in FIG. 10, enters the correspondence information of CPs into the tables, and enters the destination directory number corresponding to a CP number and a Leg number into the tables.

The Call-related table shown in FIG. 8 stores a call reference number (CALLNO.), a parent CP number, the number of child CPs (Number of Child CPs) and child CP numbers (Child_CPNO) if there is any child CPs, and a header address of the Call Record (CLRD) field storing call history information. The CLRD field stores, for each CP, call history information such as a connection date, a disconnection date, a communication time, a communications throughput, and media, etc.

The CP-related table stores, for each CP, data such as a CP number, a CP attribute, the number of Legs, data indicating the correspondence between a Leg number and a directory number. The CP attribute includes a media type, the maximum throughput of communications, a band, a transmission quality (loss of cells, etc.), a parent CP flag (indication as to whether or not it is a parent CP), a related Call number, the communications directional feature (one-way or two-way), etc.

The CP attribute table shown in FIG. 10 stores data such as a CP number, the maximum throughput of communications, a transmission quality, and data indicating the communications directional feature.

Assuming that a multimedia real estate sales support service is provided for the IN shown in FIG. 3, the control operation between the service control point 21 and the service switching point 22 is described below by referring to the signaling flowchart shown in FIG. 11. A telephone call is made from multimedia terminal unit A to terminal unit B of real estate agent to obtain the video information about real estate sent from the image providing center (video center) 23.

Figure 11A:
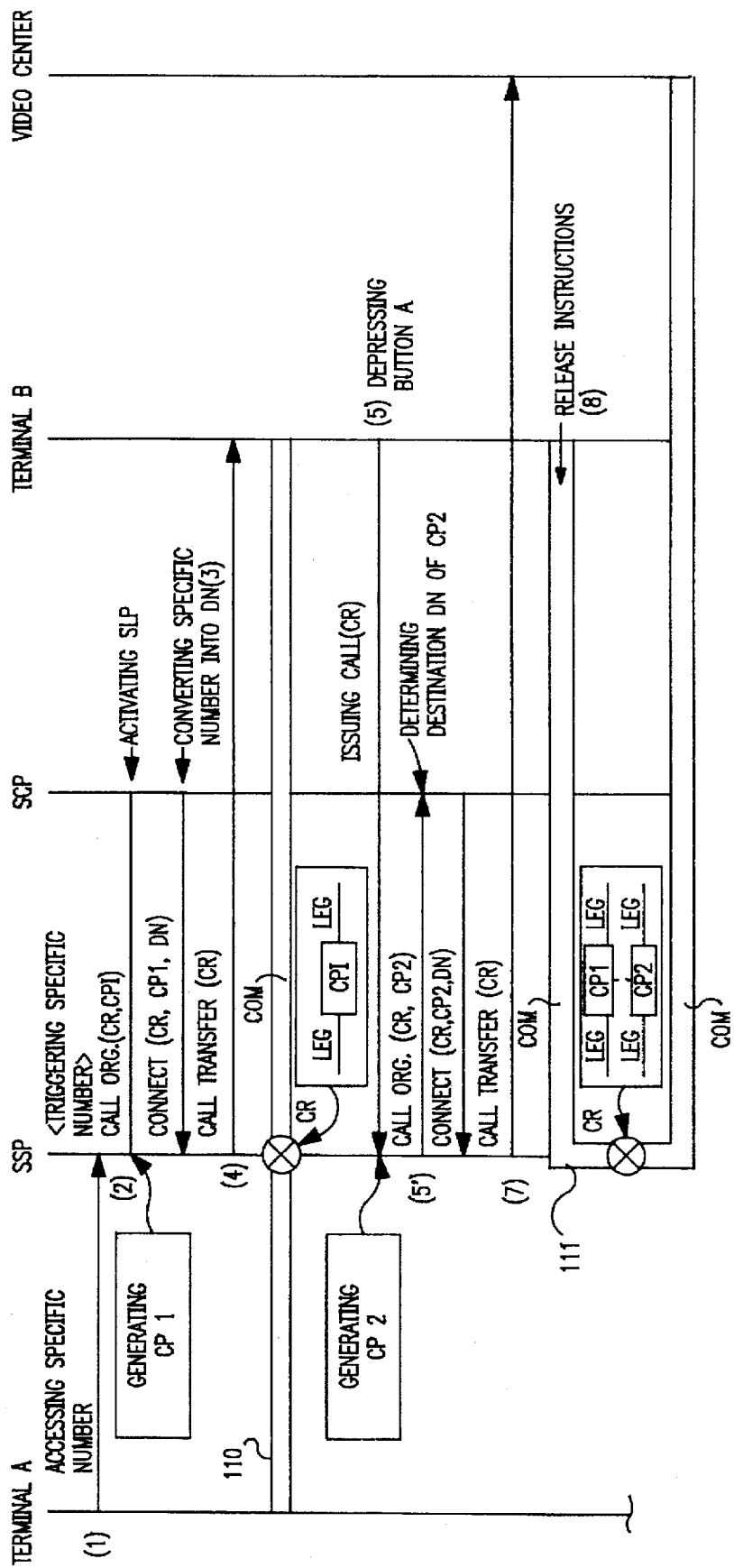
FIG. 11 shows the signaling flow.
Figure 1B:
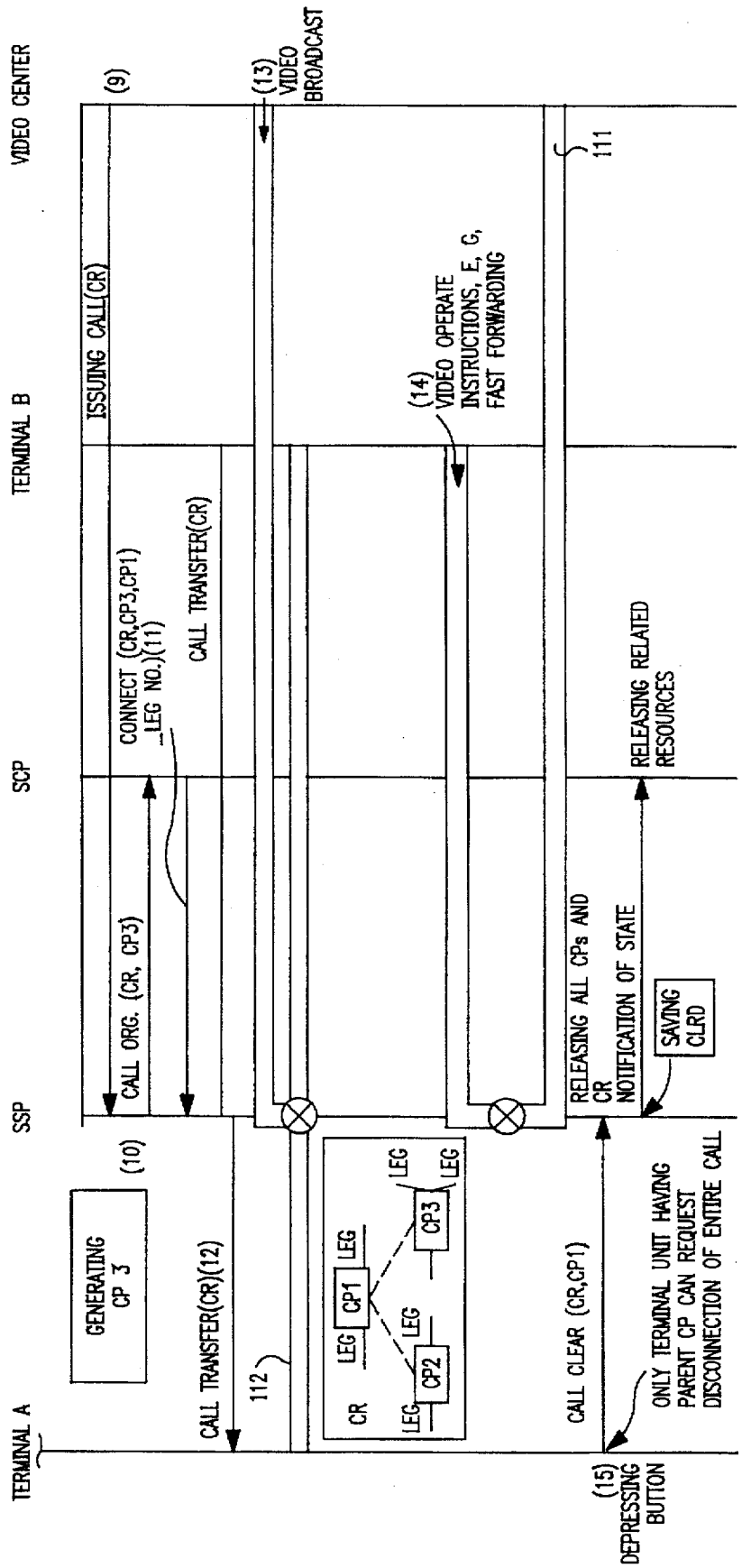

When a specific number is accessed by terminal unit A (FIG. 11(1)), the service switching point assigns to the call request a call reference number (CR) for identifying the call, a CP number (CP1), a Leg number. These data are added to a "call org" message [Call org (CR, CP1)] and transmitted to the service control point 21 (FIG. 11(2)). CP1 is a CP number assigned to a parent CP.

Upon receipt of the call request message having a specific number, the service control point 21 activates a service-logic program (SLP), converts the specific number into a corresponding directory number, and transmits the response message having the directory number [Connect (CR, CP1, DN)] to the service switching point 22 (FIG. 11(3)).

Since the service switching point 22 recognizes according to the destination directory number in the response message that the destination terminal unit is terminal unit B, the call is transmitted to terminal B of the real restate agent (FIG. 11(4)). At this time, the service switching point 22 notifies terminal B of the call reference number (CR) assigned to the call from terminal A.

If terminal B is ready to respond, a path is established between terminal A and terminal B. In FIG. 11, the solid line 110 connecting terminal A to terminal B indicates the path established between them. CP1 and two Legs connected to CP1 at the position of an SSP on the path are a connection point and Legs generated by the service switching point 22 corresponding to the communications resources of the path established between terminals A and B.

When button A of terminal unit B is depressed, a call request message having the call reference number of the call received from terminal A is transmitted from terminal B to the service switching point 22 accommodating terminal B (FIG. 11(5)). At this time, terminal B transmits the video title to be displayed on terminal A and the information about the TV system of terminal A (HDTV or Normal TV), which is designated by terminal A, with the call request message.

Upon receipt of the call request message from terminal B, the service switching point 22 recognizes according to the call reference number added to the message that the request to set a call requests to generate a child CP of CP1 (parent CP). Accordingly, the CP number "CP2" assigned to the generated connection point is entered as the child CP number (Child_CPNO.) of CP1 into the Call-related table shown in FIG. 8. Thus, one child CP is set and the number of Child CPs in the Call-related table is set to 1. Then, CP2 is entered as a CP number (CP NO.) into the CP-related table, and the CP attribute, the number of Legs, and the Leg number/directory number of CP2 are entered.

Upon entering CP2 as a child CP of parent CP1 into the Call-related tablet the service switching point 22 transmits to the service control point 21 a "Call Org" message [Call Org (CR, CP2)] having the call reference number and CP2 (FIG. 11(5')).

Figure 12:
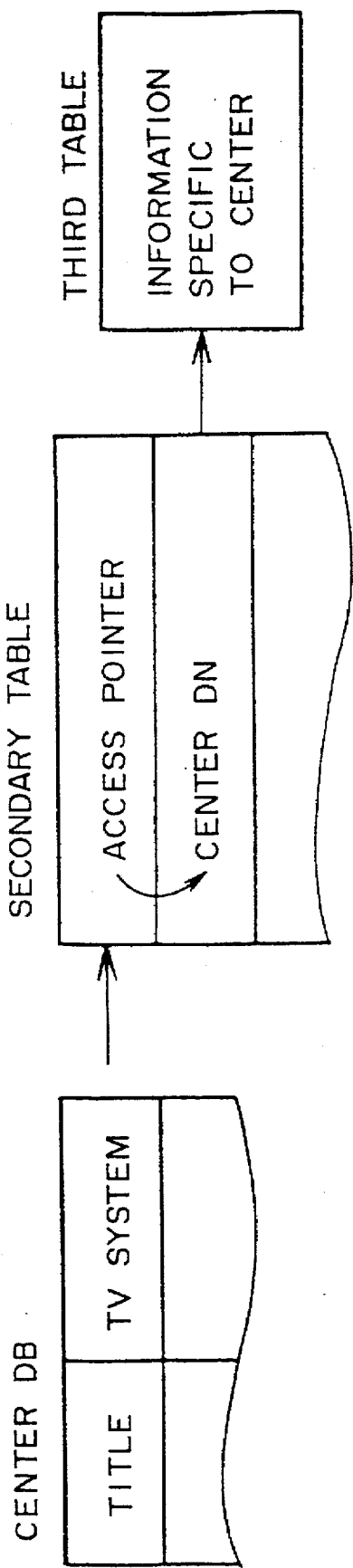
FIG. 12 shows the configuration of the center DB.

Like the service switching point 22, the service control point 21 updates the Call-related table, the CP-related table, etc. according to the received information, and then searches the data base about the image providing center 23 with the video title and the TV system specified by terminal unit B to retrieve the directory number of an appropriate center. Then, a "Connect" message provided with the retrieved directory number of the center is transmitted to the service switching point 22 (FIG. 11(6)). If a plurality of centers can be detected when the directory number is retrieved, then the service control point 21 provides an access pointer for pointing to a center on the secondary table shown in FIG. 12. Then, the directory number of the video center pointed to by the access pointer is selected. Additionally obtained is the specific information (video unit number, etc.) of the selected video center from the third table. After the selection of the video center, the value of the access pointer is incremented by 1. Thus, selecting a video center using the access pointer enables all video centers to be equally accessed even if a plurality of video centers exist.

If the directory number of a video center has been specified, the service switching point 22 transmits to the image providing center 23 an arrival message with the specified directory number as a destination directory number (FIG. 11(7)). Thus, a text communications path is established between terminal B and the image providing center 23.

In FIG. 11, the solid line 111 connecting terminal B and a video center indicates the text communications path established between them. CP2 and two Legs connected to CP2 at the position of an SSP on the path are a connection point and Legs corresponding to the communications resources of the path established between terminal S and a video center. CP1 and two Legs connected to CP1 are a CP and Legs corresponding to the communications resources of the path established between terminals A and B as described above.

If the text communications path has been established between terminal B and the video center, then terminal B specifies the start of a video broadcast by designating one of the normal replay, a high-speed replay, and a slow replay via the text communications path (FIG. 11(8)).

Then, the video center transmits to the service switching point 22 a SETUP message containing the call reference number specified by a call from terminal B so as to start the video broadcast. In this case, required media is animation.

If the service switching point 22 determines that the call setting request is a request to set a child CP based on the call reference number of the received SETUP message, then it assigns CP3 as a CP number to the call setting request, adds the call reference number, a Leg number, and a CP number to the call origination message [Call org (CR, CP3)], and transmits it to the service control point 21 (FIG. 11(10)).

The service switching point 22 retrieves the Call-related table using the call reference number and enters CP3 into the table as a child CP of the parent CP which has the same call reference number. Since two child CPs 2 and 3 have been entered for CP1, the "Number of Child_CPs" of the call-related table is set to 2.

After entering the data of CP2 into the CP-related table, entered are the CP attribute, the number of Legs, the Leg number/directory number of CP3. Since the media required by the video center is animation, the media field of the CP attribute in the CP-related table is set to animation.

The service control point 21 updates the Call-related table, the CP-related table, etc. based on the information from the service switching point 22, extracts the Leg number of CP1, that is, the parent CP of CP3, from the Call-related table and transmits it to the service switching point 22 with the Leg number of CP1 added to the "Connect" message [Connect (CR, CP3, CP1 Leg NO.))(FIG. 11(11)).

Upon receipt of the "Connect" message specifying CP3 and the Leg numbers of CP1 from the service control point 21, the service switching point 22 sends an arrival message to the terminal units specified by CP3, CP1 and the respective Leg numbers, that is, terminals A and B (FIG. 11(12)).

Thus, an animation communications path is established between the video center and terminal unit A and between the video center and terminal unit B, thereby starting a video broadcast (FIG. 11(13)).

In FIG. 11, the solid line 112 connecting terminals A and B and a video center indicates the animation communications path established among them. CP3 and three Legs connected to CP3 at the position of an SSP on the path are a connection point and Legs corresponding to the communications resources of the path established among the video center, terminals A and B. CP2 and two Legs connected to CP2 correspond to the communications resources of the path between the video center and terminal B. CP1 and two Legs connected to CP1 are a CP and Legs corresponding to the communications resources of the path established between terminals A and B.

The broken lines connecting CP1, CP2, and CP3 indicate that these connection points have a parent-child relationship with CP1 defined as a parent and CP2 and CP3 as children, and that these connection points and the Legs form a call object.

Terminal B can perform a video operation on the picture provided by the video center. For example, if terminal B issues a video operation instruction for fast forwarding, then the instruction is transmitted to the video center via the communications path of CP2, that is, the text communications path 111 established between terminal B and the video center (FIG. 11(14)).

If a user of terminal A depresses a call disconnection button to terminate the video broadcast of real estate information, then a "Call Clear" message [Call Clear (CR, CP1)] having the parameters of the call reference number and CP1 is issued from terminal A to the service switching point 22 (FIG. 11(15)). If the service switching point 22 determines according to, the call reference number added to the "Call Clear" message, that the instruction is a request to disconnect the entire multimedia call, then it refers to the Call-related table to confirm that CP1 is the parent CP with the call reference number, and releases the data relating to the call reference number in the Call-related table and the CP-related table (virtual resources) and the physical resources. Furthermore, the service switching point 22 notifies the service control point 21 that the call with the call reference number is disconnected. Upon receipt of the disconnection information about the multimedia call, the service control point 21 stores into the hard disk the call history information for each CP in the CLRD field specified in the Call-related table.

The call history information stored in the CLRD field includes date and time of a connection, date and time of a disconnection, communications time, applied throughput, transmission quality, media, number of packet segments, added service information, the number of Legs of each CP, etc. The service control point 21 can perform an accounting process for each CP or for the entire multimedia call according to the call history information.

If a user of terminal A terminates only a part of a multimedia call, for example, voice communications by setting the telephone with its receiver on the hook, then an individual disconnection request message of CP1 is transmitted from terminal A to the service switching point 22. The service switching point 22 releases only the physical resources related to CP1 in response to the CP individual disconnection request, but does not release the virtual resources associated with the Call object including CP1 in the Call-related table and the CP-related table. Thus, only the voice communications are terminated while the animation and text communications continue.

Figure 13:
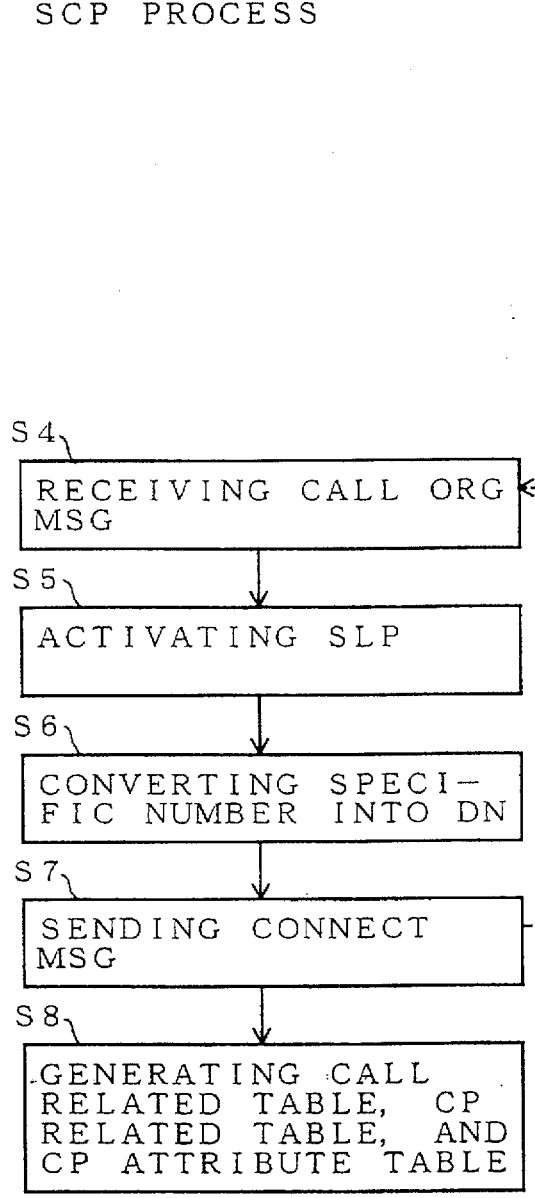
FIGS. 13 through 15 are flowcharts showing the operations of the SCP 21 and SSP 22.
Figure 13:
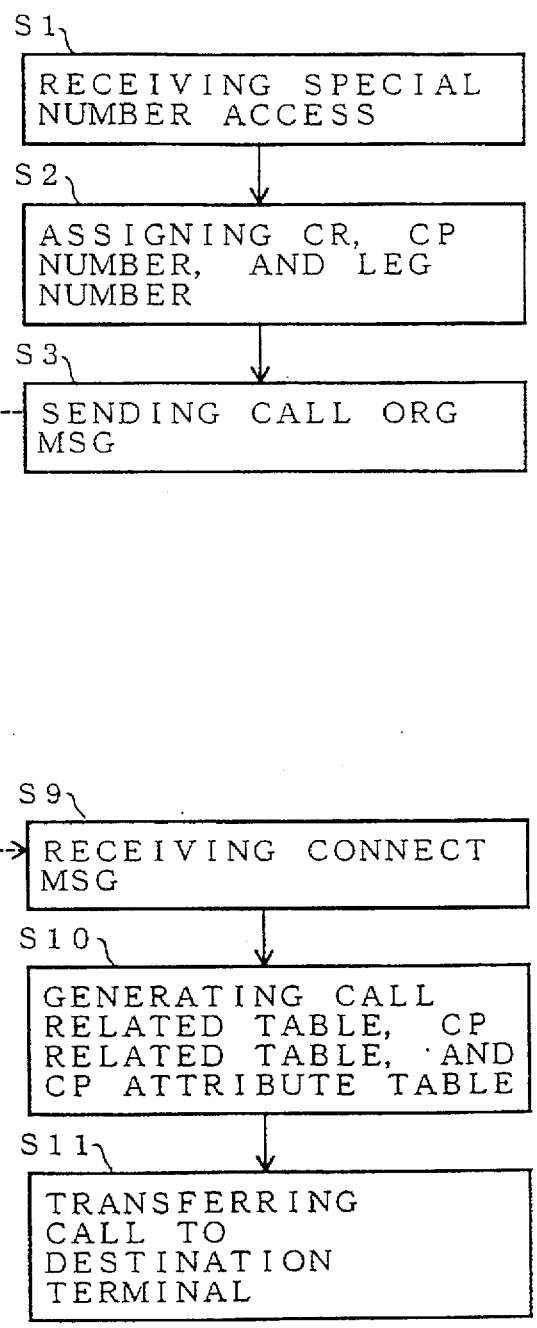

FIG. 13 is a flowchart showing the operations of the service control point (SCP) 21 and the service switching point (SSP) 22 performed when a special number is accessed by terminal A. Upon receipt of the access to a special number from terminal A (S1), the service switching point 22 assigns to the call request a call reference number (CR), a CP number, and a Leg number (S2), adds these information to the call origination message (CALL ORG MSG), and sends it to the SCP 21 (S3).

When the SCP 21 receives the CALL ORG MSG (S4), it activates a service logic program (SLP) (S5), and converts the specified special number into a corresponding directory number (S6). Then, it sends to the SSP 22 a response message (CONNECT MSG) provided with the directory number (S7).

Then, the SCP 21 generates a Call related table, a CP related table, and a CP attribute table as shown in FIGS. 8 and 10, and enters related data into the tables (S8).

When the SSP 222 receives the response message sent from the SCP 21 in S7 (S9), it also generates a Call related table, a CP related table, and a CP attribute table as with the SCP 21, and enters related data into the tables (S10). Then, it sends the call to the terminal specified by the directory number added to the received response message (S11).

Figure 14:
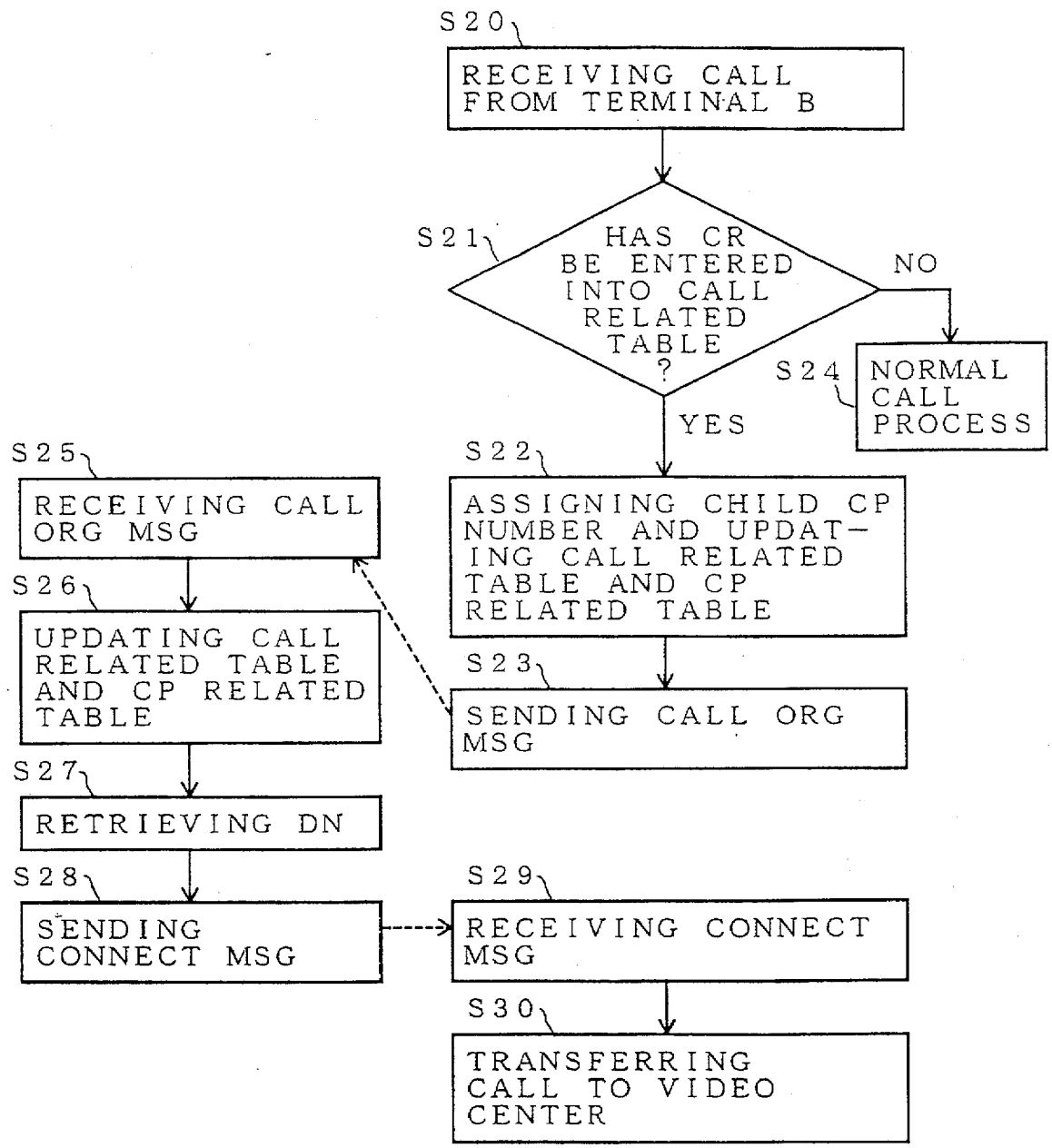

FIG. 14 is a flowchart showing the operation of the SCP 21 and the SSP 22 performed when the button A of terminal B is pressed.

When the SSP 22 receives from terminal B a call request message caused by the press of the button (S20), it is determined whether or not the CR added to the message has been entered into the Call related table (S21). If it is determined that the CR has been entered into the Call related table (yes in S21), then the call set request can be recognized as a request for the generation of a child connection point. Therefore, the CP number assigned to the generated connection point is entered as a child CP into the Call related table. Thus, one child CP has been set, and the number of child CPs in the call related table is set to 1. Then, CP2 is entered as the CP number (CP No.) into the CP related table, and the CP attribute, the number of Legs, and the Leg number/directory number of CP2 are set (S22).

After the SSP 22 has entered CP2 as a child CP of the parent CP1 into the Call related table, it sends to the SCP 21 a CALL ORG MSG provided with a CR and CP number (S23).

If it is determined by the SSP 22 in S21 that the CR is not entered into the Call related table (no in S21), then the request is not for generating a child connection point and SSP 22 performs a normal call process Upon receipt of the CALL ORG MSG sent from the SSP 22 in S23 (S25), the SCP 21 updates the Call related table, the CP related table, etc. according to the received information as with the SSP 22 (S26). Then, the data base about the image providing center 23 is searched for a directory number of an operable image providing center based on the information specified by terminal B (S27). Then, a CONNECT MSG provided with the directory number of the detected center is transmitted to the SSP 22 (S28).

When the SSP 22 receives the CONNECT MSG transmitted from the SCP 21 (S29), it transmits to the video center 23 a message using the directory number attached to the CONNECT MSG as a destination directory number (S30).

Figure 15:
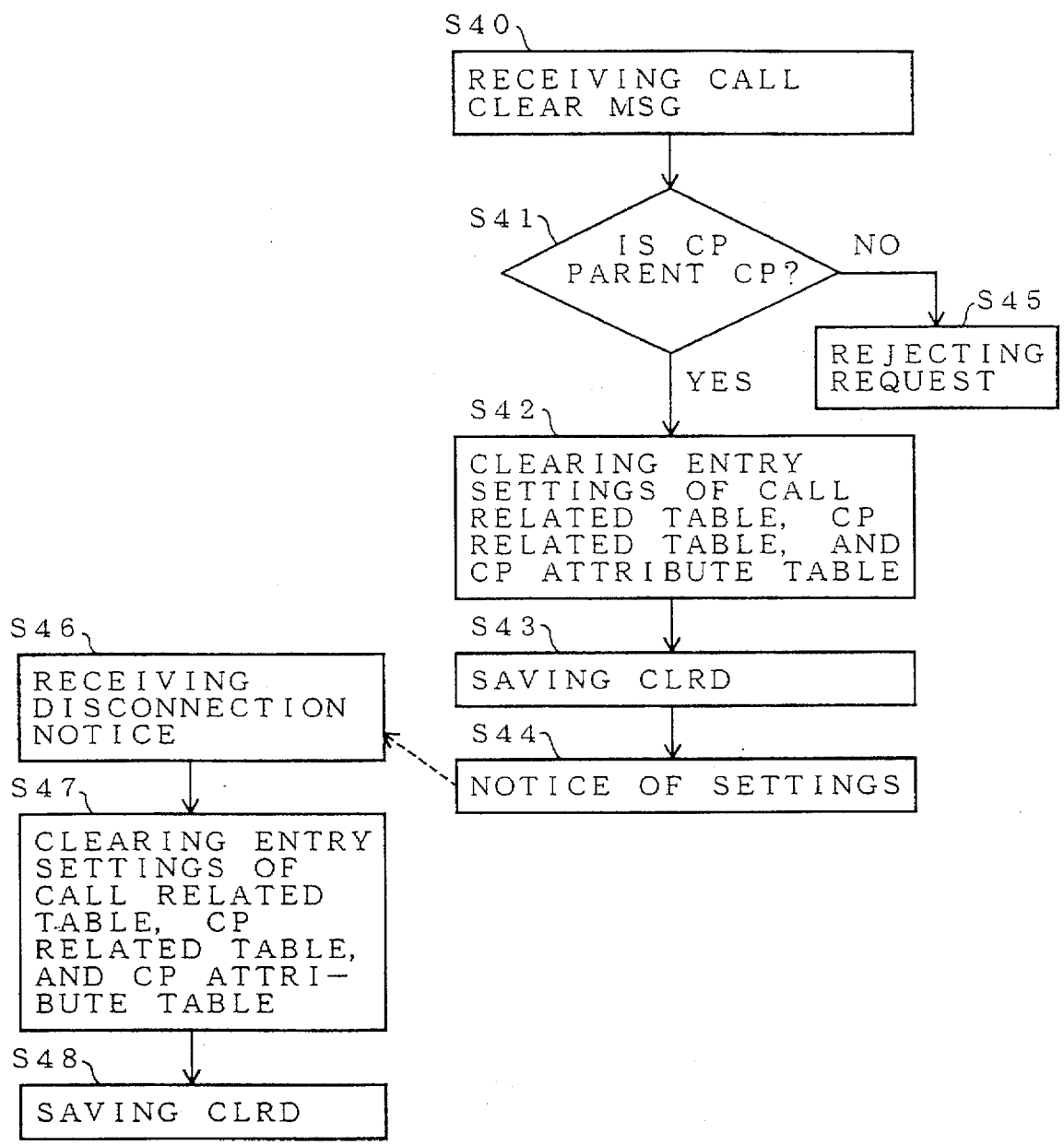

FIG. 15 is a flowchart showing the operations of the SCP 21 and the SSP 22 performed when a user of terminal A presses a call disconnection button to terminate a video broadcast of real estate information.

The SSP 22 receives from terminal A a call clear message (CALL CLEAR MSG) having parameters of CR and CP1 (S40). If the SSP 22 determines according to the parameter of a CR, etc. added to the CALL CLEAR MSG that a request for disconnecting an entire multimedia call has been issued, then it further determines whether or not the CP which issued the request is a parent CP by referring to the Call related table (S41).

If it is determined that the CP is a parent CP (yes in S41), then released are the physical resources and the data related to the CR in the Call related table, the CP related table, and the CP attribute table (virtual resources) (S42). Then, call history information for each CP is stored into the hard disk from a CLRD field specified in the Call related table (S43). The disconnection of a call with the CR is reported to the SCP 21 (S44).

If the SSP 22 determines that the CP is not a parent CP in S41 (no in S41), then the SSP 22 rejects the request for disconnecting an entire multimedia call (S45).

Upon receipt of the disconnection information about the multimedia call sent from the SSP 22 in S44 (S46), the SCP 21, as with the SSP 22, releases the physical resources and the data related to the CR in the Call related table, the CP related table, and the CP attribute table (virtual resources) (S47). Then, call history information for each CP is stored into the hard disk from a CLRD field specified in the Call related table (S48).

In the multimedia communications using plural types of media including voice, animation, and text according to the above described embodiment, CPs and Legs are defined for each type of media and each CP is defined as a parent or a child. Thus, a plurality of calls, each requiring different media, can be processed as a single Call object and therefore a load in a call processing can be reduced in the service control point 21 and the service switching point 22 more than in the case where a plurality of calls of different media are processed separately. Furthermore, recording call history information for each connection point simplifies a process of charging an account on a multimedia call. Furthermore, collectively processing a plurality of calls as a single multimedia call prevents a user from repeating the same operation for each call, thereby reducing user entry operations.

The above described embodiment is realized by applying the present invention to an intelligent network in an ATM switching network. However, the present invention is not limited to this application, but can be applied to multimedia communications among terminal units connected to other switching network or a computer network having no switching function. Furthermore, it is applicable to a communications network other than an advanced intelligent network.

What is claimed is:

1. A multimedia communications control method for controlling communications using a plurality of media among terminal units, comprising the steps of:
   (a) generating an object which defines a relation with other objects and corresponds to communications resources assigned to a multimedia communications request, including the substeps of
      (a1) assigning a call identification number identifying a call in response to a first call request from a terminal unit,
      (a2) generating a parent connection point and a Leg for communications resources assigned to the first call, and
      (a3) generating a child connection point and a Leg for the communications resources of a call in response to a call request which has said call identification number and is generated after the first call request;
   (b) generating an integral object for integrating a plurality of said objects, including the substep of
      (b1) generating a Call object for integrating plural connection points and Legs having said call identification number; and
   (c) integrally controlling communications using different media by managing a plurality of objects belonging to said integral object based on relations among the plurality of objects, including
      (c1) integrally controlling a plurality of calls based on relations among connection points belonging to a same call object.

2. A multimedia communications system in which said multimedia communications system is an intelligent network system and terminal units communicate with each other through a plurality of media, comprising:
   object generating means for generating an object which defines a relationship with other objects and corresponds to communications resources assigned to a communications request in a multimedia communication, and for generating an integral object for managing a plurality of objects; and
   communications control means for collectively controlling communications through different media by managing a plurality of objects belonging to a same said integral object generated by said object generating means based on a relationship between said plurality of objects,
   said object generating means generating, when a call request is issued, an object including Legs corresponding to communications resources assigned for a call and a connection point which connect the Legs, said connection point generated for a first call request being defined as a parent connection point having a capability of entire call disconnection, said connection point subsequently generated for a same multimedia call being defined as a child connection point not having a capability of entire call disconnection, and generating a Call object for integrating the parent connection point and its Legs and the child connection points and its Legs, and
   said communications control means collectively controlling a plurality of calls based on the relationship among the connection points belonging to a same Call object.

3. A multimedia communications system in which terminal units communicate with each other through a plurality of media comprising:
   object generating means for generating an object which defines a relationship with other objects and corresponds to communications resources assigned to a communications request in a multimedia communication, for generating an integral object for managing a plurality of objects, when a call request is issued for generating an object including Legs corresponding to communications resources assigned for a call and a connection point which connect the Legs, said connection point generated for a first call request being defined as a parent connection point, said connection point subsequently generated being defined as a child connection point, generating a Call object for integrating the parent connection point and its Legs and the child connection points and its Legs, assigning a call reference number to the first call request from a terminal unit, generating the parent connection point and the Leg corresponding to the communications resources assigned to the first call, generating the child connection points and the Legs corresponding to the communications resources assigned to the call requests subsequently generated, and generating a Call object for integrating a plurality of connection points having a same call reference number and the Legs; and communications control means for collectively controlling communications through different media by managing a plurality of objects belonging to a same said integral object generated by said object generating means based on a relationship between the plurality of objects, and a plurality of calls based on the relationship among the connection points belonging to a same Call object.

4. A multimedia communications system in which terminal units communicate with each other through a plurality of media, comprising:

object generating means for generating an object which defines a relationship with other objects and corresponds to communications resources assigned to a communications request in a multimedia communication, and for generating an integral object for managing a plurality of objects, when a call request is issued, for generating an object including Legs corresponding to communications resources assigned for a call and a connection point which connect the Legs, said connection point generated for a first call request being defined as a parent connection point, said connection point subsequently generated being defined as a child connection point, for generating a Call object for integrating the parent connection point and its Legs and the child connection points and its Legs, for assisting a call reference number to the first call request from a terminal unit, for generating the parent connection point and the Leg corresponding to the communications resources assigned to the first call, for generating the child connection points and the Legs corresponding to the communications resources assigned to the call requests subsequently generated, and for generating a Call object for integrating a plurality of connection points having a same call reference number and the Legs; and communications control means for collectively controlling communications through different media by managing a plurality of objects belonging to a same said integral object generated by said object generating means based on a relationship between the plurality of objects and a plurality of calls based on the relationship among the connection points belonging to a same Cell object, disconnecting a multimedia call by releasing the plurality of connection points and the Legs belonging to the Call object only if a terminal unit having the parent connection point has issued a request to release the call object, and disconnecting the call individually by releasing a connection point and a Leg specified by a request for an individual release if a terminal unit having the parent or child connection point has issued the request for the individual release.

5. A multimedia communications system in which terminal units communicate with each other through a plurality of media, comprising:

object generating means for generating an object which defines a relationship with other objects and corresponds to communications resources assigned to a communications request in a multimedia communication, for generating an integral object for managing a plurality of objects, when a call request is issued, for generating an object comprising Legs corresponding to communications resources assigned for a call and a connection point which connect the Legs, said connection point generated for a first call request being defined as a parent connection point, said connection point subsequently generated being defined as a child connection point, for generating a Call object for integrating the parent connection point and its Legs and the child connection points and its Legs, for assigning a call reference number to the first call request from a terminal unit, for generating the parent connection point and the Leg corresponding to the communications resources assigned to the first call, for generating the child connection points and the Legs corresponding to the communications resources assigned to the call requests subsequently generated, and for generating a Call object for integrating a plurality of connection points having a same call reference number and the Legs, said object generating means including first storing means for storing information which indicates a correspondence between the parent connection point and the child connection point, and second storing means for storing information which indicates a correspondence between a Leg number of each connection point and a terminal unit specification number in a communications network; and communications control means for collectively controlling a multimedia call according to the information stored in said first storing means and the information stored in said second storing means and for collectively controlling communications through different media by managing a plurality of objects belonging to a same said integral object generated by said object generating means based on a relationship between the plurality of objects, and a plurality of calls based on the relationship among the connection points belonging to a same Call object.

6. The multimedia communications system according to claim 3, wherein said communications control means disconnects a multimedia call by releasing the plurality of connection points and the Legs belonging to the Call object only if a terminal unit having the parent connection point has issued a request to release the call object, and disconnects the call individually by releasing a connection point and a Leg specified by a request for an individual release if a terminal unit having the parent or child connection point has issued the request for the individual release.

7. The multimedia communications system according to claim 3, wherein said object generating means comprises:
first storing means for storing information which indicates a correspondence between the parent connection paint and the child connection point; and
second storing means for storing information which indicates a correspondence between a Leg number of each connection point and a terminal unit specification number in a communications network; and said communications control means collectively controls a multimedia call according to the information stored in said first storing means and the information stored in said second storing means.

8. A multimedia communications system in which terminal units communicate with each other through a plurality of media and said multimedia communications system is an intelligent network system, comprising:

object generating means for generating an object which defines a relationship with other objects and corresponds to communications resources assigned to a communications request in a multimedia communication, for generating an integral object for managing a plurality of objects, when a call request is issued, for generating an object including Legs corresponding to communications resources assigned for a call and a connection point which connect the Legs, said connection point generated for a first call request being defined as a parent connection point, said connection point subsequently generated for a same multimedia call being defined as a child connection point, for generating a Call object for integrating the parent connection point and its Legs and the child connection point and it Legs, for assigning a call reference number to the first call request from a terminal unit, for generating the parent connection point and the Leg corresponding to the communications resources assigned to the first call, for generating the child connection points and the Legs corresponding to the communications resources assigned to the call requests subsequently generated, and for generating a Call object for integrating a plurality of connection points having a same call reference number and the Legs; and communications control means for collectively controlling communications through different media by managing a plurality of objects belonging to a same integral object generated by said object generating means based on a relationship between the plurality of objects, and a plurality of calls based on the relationship among the connection points belong to a same Call object, for releasing only physical resources for the connection point if a terminal unit has issued a request to individually release the connection point, and not releasing virtual resources related to the Call object, and for releasing a multimedia call only from a terminal unit connected to a Leg of the parent connection point.

9. The multimedia communications system according to claim 6, wherein said object generating means comprises:

first storing means for storing information which indicates a correspondence between the parent connection point and the child connection point; and second storing means for storing information which indicates a correspondence between a Leg number of each connection point and a terminal unit specification number in a communications network; and said communications control means collectively controls a multimedia call according to the information stored in said first storing means and the information stored in said second storing means.

10. The multimedia communications system according to claim 6, wherein said communications control means releases only physical resources for the connection point if a terminal unit has issued a request to individually release the connection point, and does not release virtual resources related to the Call object.

11. The multimedia communications system according to claim 7, wherein said first storing means stores a call reference number for use in identifying a multimedia call, a parent connection point number, a child connection point number, and call history information for each connection point;

said second storing means stores at least a connection point number, a media type, a maximum communications throughput, and information indicating a correspondence between a Leg number and a terminal unit specification number; and said communications control means charges an account on the multimedia call based on the call history information for each connection point stored in said first storing means.

12. The multimedia communications system according to claim 9, wherein said first storing means stores a call reference number for use in identifying a multimedia call, a parent connection point number, a child connection point number, and call history information for each connection point;

said second storing means stores at least a connection point number, a media type, a maximum communications throughput, and information indicating a correspondence between a Leg number and a terminal unit specification number; and said communications control means charges an account on the multimedia call based on the call history information for each connection point stored in said first storing means.

13. A multimedia communications system operated in an intelligent network system including a service control point for collectively managing services provided in a communications network and a plurality of service switching points for processing a call to a terminal unit, wherein each of said service control point and said service switching point comprises:

object generating means for assigning a call reference number to a first call request from a terminal unit, generates a parent connection point and a Leg corresponding to communications resources assigned to the first call, generates child connection points and Legs corresponding to communications resources assigned to call requests subsequently generated with said call reference number, and generates a Call object for integrating a plurality of connection points having said call reference number and the Legs; and communications control means for collectively controlling a plurality of calls based on a relationship between the parent connection point and the child connection points belonging to a same call object.

14. The multimedia communications system according to claim 13, wherein said service control point includes a data base in which an access pointer is provided for sequentially pointing to one of a plurality of information providing centers so that the centers can be equally accessed.

15. The multimedia communications system according to claim 13, wherein the service switching point transmits to the service control point information specifying a type of images receivable by a terminal unit requesting an image information so that a center capable of broadcasting the image information can be selected by the service control point.

\* \* \* \* \*

UNITED STATES PATENT AND TRADEMARK OFFICE
CERTIFICATE OF CORRECTION

PATENT NO. : 5,717,859
DATED : February 10, 1998
INVENTOR(S) : Yunoki

It is certified that error appears in the above-identified patent and that said Letters Patent is hereby corrected as shown below:

Col. 6,    line 28, "Go" should be --to--.
            line 46, "Child CPs should be --Child_CPs.

Col. 7,    line 9, "point" should be --point 22--.

Col. 8,    line 27, "S" should be --B--.

Col. 10,  line 56, "process" should be --process (S24).--.

Col. 12,  line 16, after "including" insert --the substep of--.
            line 55, "media" should be --media,--.

Col. 13,  line 39, "assisting" should be --assigning--.
            line 55, "Cell" should be --Call--.

Col. 14,  line 63, "paint" should be --point--.

Signed and Sealed this

Tenth Day of November 1998

Attest:

BRUCE LEHMAN

Attesting Officer         Commissioner of Patents and Trademarks